(12) United States Patent
Vilar et al.

(10) Patent No.: US 8,836,256 B2
(45) Date of Patent: Sep. 16, 2014

(54) SWITCHED RELUCTANCE MOTOR TORQUE ESTIMATION

(75) Inventors: Zimin W. Vilar, Dubuque, IA (US); Chris J. Tremel, Fargo, ND (US)

(73) Assignee: Deere & Company, Moline, IL (US)

( * ) Notice: Subject to any disclaimer, the term of this patent is extended or adjusted under 35 U.S.C. 154(b) by 242 days.

(21) Appl. No.: 13/547,364

(22) Filed: Jul. 12, 2012

(65) Prior Publication Data

US 2014/0015459 A1  Jan. 16, 2014

(51) Int. Cl.
*H02P 6/12* (2006.01)

(52) U.S. Cl.
USPC ............. 318/400.15; 318/400.07; 318/254.1; 318/701; 318/107; 318/434; 363/132; 363/98; 701/81; 701/82; 701/83; 701/88; 701/90; 180/65.1; 180/65.285; 180/65.51

(58) Field of Classification Search
CPC ............... H02P 25/085; H02P 21/148; H02P 2009/002; H02P 25/08; H02P 9/00; H02P 5/74; H02P 6/14; H02P 6/16; H02P 6/182; H02P 6/08; H02P 2209/07; H02P 6/06; H02P 25/28; B60L 2220/18; B60L 11/08; B60L 2110/40; B60L 2240/423; A47L 9/2826; A47L 9/2831; A47L 9/2842
USPC ............ 318/400.15, 400.07, 701, 254.1, 430, 318/432, 400.3, 722, 800, 650, 107, 143, 318/434, 717; 180/65.1, 65.285, 65.51; 137/565.11, 563, 565.16, 565.29; 701/81, 82, 83, 88, 90, 22; 363/132, 98
See application file for complete search history.

(56) References Cited

U.S. PATENT DOCUMENTS

| | | | |
|---|---|---|---|
| 5,771,166 A | 6/1998 | Lim | |
| 5,872,441 A | 2/1999 | McCann | |
| 6,008,601 A | 12/1999 | Sugiyama | |
| 6,528,964 B2 | 3/2003 | Schulz et al. | |
| 6,788,021 B2 | 9/2004 | Sozer et al. | |
| 6,975,090 B2 | 12/2005 | Biebach | |
| 7,201,244 B2 | 4/2007 | Johnston et al. | |
| 7,202,625 B2 | 4/2007 | Adra et al. | |
| 2002/0171288 A1 | 11/2002 | Ahlgren | |
| 2008/0067965 A1 | 3/2008 | Bailey et al. | |
| 2008/0221771 A1 | 9/2008 | Olsson | |
| 2008/0315896 A1 | 12/2008 | Fahimi et al. | |
| 2009/0243522 A1* | 10/2009 | Suhama et al. | ............... 318/376 |
| 2010/0097732 A1 | 4/2010 | Dean | |
| 2010/0134056 A1 | 6/2010 | Yamamoto et al. | |
| 2012/0217920 A1* | 8/2012 | Singh et al. | ................... 318/490 |

OTHER PUBLICATIONS

Lovatt, HC and Stephenson, JM, "Optimum Excitation of Switched Reluctance Motors" (5 pages)(admitted prior art).
Chancharoensook, R and Rahman, M.F., A Modified Switching Strategy for Asymmetric Half-Bridge Converters for Switched Reluctance Motor Drives (6 pages)(admitted prior art).
Ou, Lisheng; Liang, Zhonghua; Ge, Lijun; and Hu, Qing, "A Torque Control Solution for the Switched Reluctance Motor With Digital Signal Processor" (4 pages)(admitted prior art).

(Continued)

*Primary Examiner* — Eduardo Colon Santana
*Assistant Examiner* — Jorge L Carrasquillo

(57) ABSTRACT

A drive system has a switched reluctance motor (SR motor) and a control system configured to determine an estimated total torque of SR motor as a function of the phase voltages and phase currents of the phases of the SR motor.

13 Claims, 5 Drawing Sheets

(56) References Cited

OTHER PUBLICATIONS

Visinka, Radim, "3-Phase Switched Reluctance (SR) Sensorless Motor Control Using a 56F80x, 56F8100 or 56F8300 device," AN1932, Rev. 2 (64 pages)(Feb. 2005).

Balazovic, Peter and Visinka, Radim, "3-Phase Switched Reluctance Motor Control With Encoder Using DSP56F80x," AN1937/D, Rev. 0 (56 pages)(Sep. 2002).

Hossain, Syed; Husain, Iqbal; Klode, Harald; Lequesne, Bruno; and Omekanda, Avoki, "Four-Quadrant Control of a Switched Reluctance Motor for Highly Dynamic Actuator Load," IEEE (7 pages)(2002).

"Digitial Signal Processing Solutions for the Switched Reluctance Motor," Texas Instruments Incorporated, Literature Number: BPRA058 (23 pages)(Jul. 1997).

Husain, Iqbal and Ehsani, Mehrdad "Rotor Position Sensing in Switched Reluctance motor Drives by Measuring Mutually Induced Voltages," IEEE Transactions on Industry Applications, vol. 30, No. 3 (8 pages)(May/Jun. 1994).

Ramamurthy, S.S. and Balda, J.C., "Intelligent and Adaptive On-line Direct Electromagnetic Torque Estimator for Switched Reluctance Motors Based on Artificial Neural Networks," IEEE (5 pages)(admitted prior art).

McCann, Roy and Traore, Wendyam, "Investigation of Direct Flux Measurements in Switched Reluctance Motors," IEEE (7 pages)(2008).

Lin, Zhengyu; Reay, Donald S.; Williams, Barry W.; and He, Xiangning, "On-line Torque Estimation in a Switched Reluctance Motor for Torque Ripple Minimisation," IEEE (5 pages)(2004).

Khalil, Ahmed O., "Modeling and Analysis of Four Quadrant Sensorless Control of a Switched Reluctance Machine Over the Entire Speed Range" (171 pages)(Aug. 2005).

DiRenzo, Michael T., "Switched Reluctance Motor Control—Basic Operation and Example Using the TMS320F240," Texas Instruments Incorporated, SPRA420A (62 pages)(Feb. 2000).

Background Information (1 page)(admitted prior art).

Wadnerkar, Vikas S.; Das, Dr. G. Tulasiram; and Rajkumar, Dr. A.D., "Performance Analysis of Switched Reluctance Motor; Design, Modeling and Simulation of 8/6 Switched Reluctance Motor," Journal of Theoretical and Applied Information Technology, pp. 1118-1124 (2008).

Bartos, Frank J., "Resurgence for Sr Motors, Drives?" Control Engineering, Mar. 2010, pp. 38-40.

Clothier, A.C., "Inverter Topologies and Current Sensing Methods for Short Pitched and Fully Pitched Winding SR Motors," http://www.powerpulse.net/techPaper.php?paperID=55&print (11 pages)(admitted prior art).

Stiebler, M. and Li, R., Abstract of "Calculation of Magnetic Field of a Switched Reluctance Motor using a Microcomputer," European Transactions on Electrical Power, vol. 2, Issue 2, Abstract on http://onlinelibrary.wiley.com/doi/10.1002/etep.4450020206/abstract (3 pages)(Mar./Apr. 1992).

"Basic of SR Motor Control: How to Implement a Switched Reluctance Motor Drive?" Accessed at http://dr-ooi.com/Basic_of_SR_Motor_5.htm (1 page)(admitted prior art).

* cited by examiner

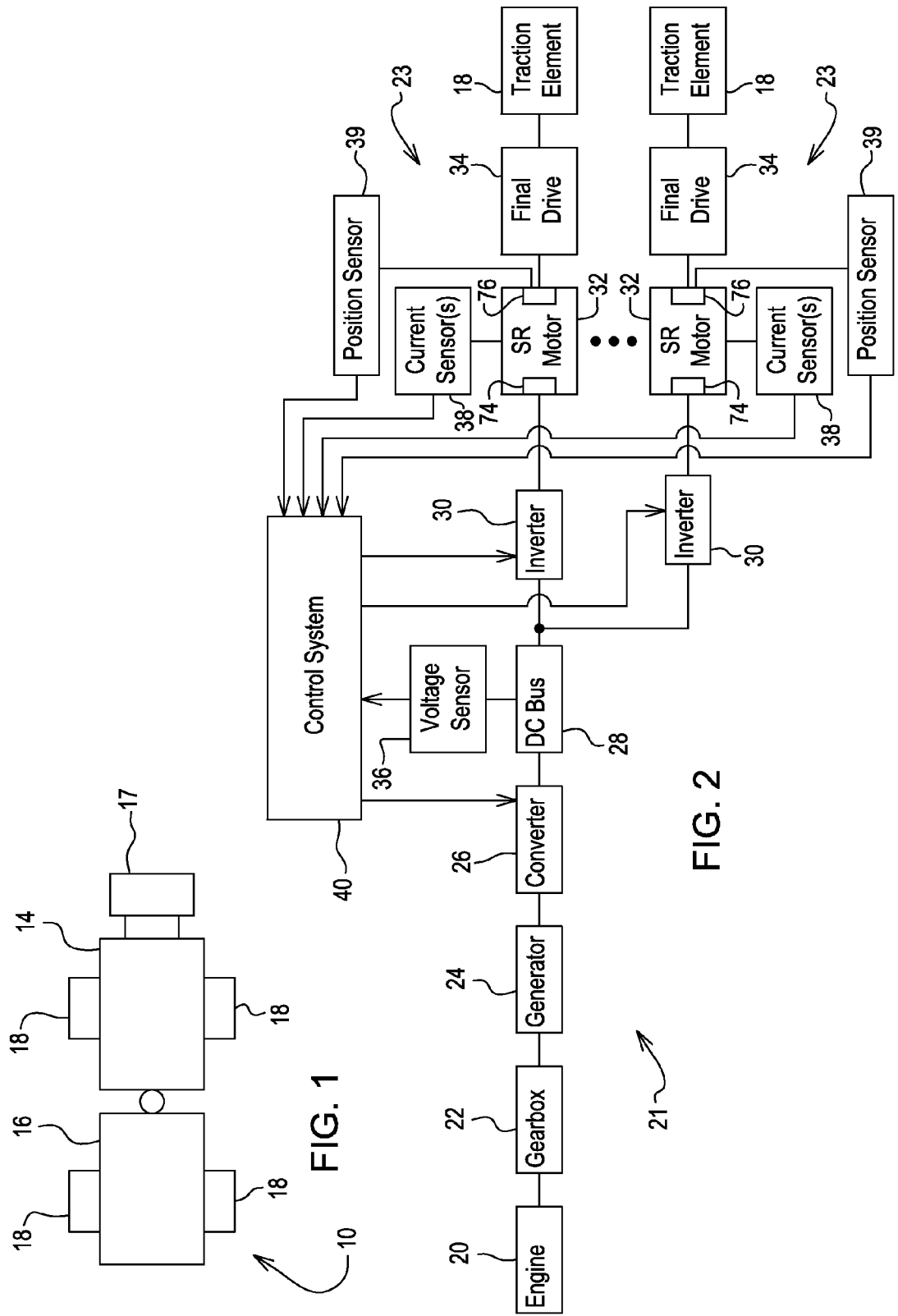

SWITCHED RELUCTANCE MOTOR TORQUE ESTIMATION

FIELD OF THE DISCLOSURE

The present disclosure relates to torque estimation of a switched reluctance motor (SR motor).

BACKGROUND OF THE DISCLOSURE

It is known for a drive system for a series hybrid vehicle to have an engine (e.g., internal combustion engine), a generator coupled to the engine, a DC bus ("DC" means direct current), and a motor. The DC bus is coupled electrically between the generator and the motor to drive one or more traction elements of the vehicle. A converter is coupled electrically between the generator and the DC bus and is controlled to convert AC power ("AC" means alternating current) into DC power during generating of the generator and DC power into AC power during motoring of the generator. A power inverter is coupled electrically between the DC bus and the motor and is controlled to convert DC power from the DC bus into AC power during motoring of the motor and to convert AC power into DC power during electrical braking of the motor.

A switched reluctance motor (SR motor) is a type of electric motor. Traditionally, the SR motor has been controlled using open-loop table-based control. However, this type of control cannot compensate for the dynamic variants in the system, such as the DC bus voltage or phase currents of the phases of the SR motor. This is due to the fact that control tables are tuned or calculated as a function of test stand setup at a fixed DC bus voltage. If, in practice, the DC bus voltage departs from that voltage, or the actual phase current has drifted from the commanded phase current, the actual torque generated by the SR motor is not the torque requested.

SUMMARY OF THE DISCLOSURE

According to an aspect of the present disclosure, there is provided a drive system. The drive system comprises a DC bus, a switched reluctance motor (SR motor), a power inverter, a voltage sensor, current sensors, and a control system. The power inverter is coupled electrically between the DC bus and the SR motor. The SR motor comprises phases each of which is operable in operational modes. The voltage sensor is coupled electrically to the DC bus to sense a DC bus voltage of the DC bus and output a DC bus voltage signal indicative thereof. Each current sensor is coupled electrically to a respective phase of the phases of the SR motor to sense a phase current of that phase and output a phase current signal indicative of that phase current.

The control system is coupled electrically to the voltage sensor and the current sensors. The control system is configured to control the power inverter so as to activate the phases sequentially in electrical cycles and so as to operate each phase selectively in the operational modes. The control system is configured to: receive the DC bus voltage signal and the phase current signals, determine for each of the phases which one of the operational modes is active, with respect to each of the phases determine a phase voltage of that phase according to a function that is dependent on which one of the operational modes is active for that phase so as to differ between the operational modes and that is dependent on the DC bus voltage, and the phase current for that phase, and determine an estimated total torque of the SR motor with respect to an electrical cycle of the electrical cycles as a function of an estimated total energy outputted to a rotor of the SR motor by the phases during the electrical cycle by calculating a phase power for each phase as a product of the phase current for that phase and the phase voltage for that phase, integrating the phase powers with respect to time for the electrical cycle, and dividing by an electrical angle of the electrical cycle.

The control system may account for dynamic variants in the drive system, such as, for example the DC bus voltage and phase currents. The DC bus voltage may drop or increase relative to its nominal voltage depending, for example, on whether the SR motor is motoring or braking. The control system may receive readings of the actual DC bus voltage in order to take into consideration variation in the DC bus voltage. The control system may receive readings of each phase current to take into account variation in each phase current. The control system may thus account for dynamic variants in the drive system.

The above and other features will become apparent from the following description and the attached drawings (welds and hoses not shown in drawings, but understood).

BRIEF DESCRIPTION OF THE DRAWINGS

The detailed description of the drawing refers to the accompanying figures in which:

FIG. 1 is a diagrammatic view of a hybrid vehicle having a number of traction elements;

FIG. 2 is a diagrammatic view showing a drive system for the vehicle;

DETAILED DESCRIPTION OF THE DRAWINGS

Figure 3:
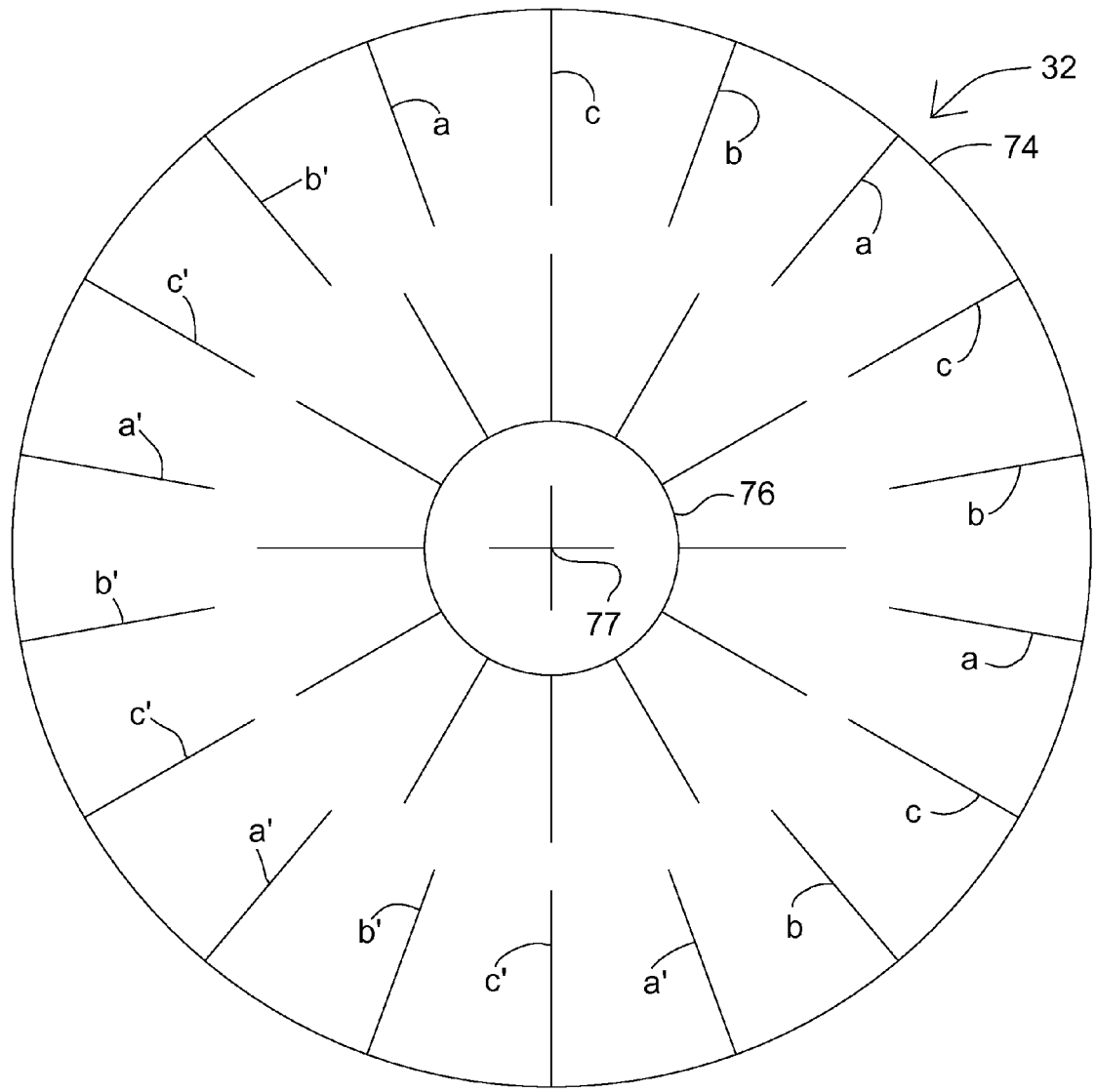
FIG. 3 is a diagrammatic view showing the rotor and stator of a switched reluctance motor (SR motor) of the drive system.

Referring to FIG. 1, there is shown diagrammatically a hybrid vehicle 10 having a series hybrid-electrical drive system 12 (FIG. 2). The vehicle 10 is, for example, a work vehicle or other vehicle.

In the case of a work vehicle, the vehicle 10 may be, for example, a four-wheel drive loader or other type of work vehicle (e.g., construction, forestry, agriculture, or turf, to name but a few). As a four-wheel drive loader, the vehicle 10 may have a front section 14 and a rear section 16 articulated to the front section 14, the front section 14 having, for example, a bucket 17 for digging and dumping material, the rear section 16 having, for example, the operator's station and the engine compartment rearward thereof. Each of the front and rear sections 14, 16 has a left traction element 18 and a right traction element 18, each traction element configured, for example, as a ground-engaging wheel.

Referring to FIG. 2, the drive system 12 has an engine 20, one or more supply units 21 coupled to the engine 20, and one or more consumption units 23 coupled to each supply unit 21 so as to be in association therewith. Exemplarily, each supply unit 21 includes a gearbox 22, a generator 24, a power converter 26 (e.g., a multi-phase converter), and a DC bus 28. Each consumption unit 23 includes a power inverter 30 (e.g., a multi-phase inverter) coupled electrically to the DC bus 28 with which the consumption unit 23 is associated, a switched reluctance motor 32 (SR motor) as a traction motor (a traction SR motor), and a final drive 34. Exemplarily, each final drive 34 is coupled respectively to a traction element 18 such that there is a consumption unit 23 respectively for each traction element 18. In other words, the drive system 12 has as many consumption units 23 as traction elements 18.

In an example, the drive system 12 has two supply units 21 and four consumption units 23, two of which are coupled to each supply unit 21. The two supply units 21 are coupled to the engine 20 via their gearboxes 22 (or via their generators 24 in cases where there are no such gearboxes 22) so as to be driven by the engine 20. There are two consumption units 23 coupled to each supply unit 21 via their power inverters 30. The consumption units 23 are coupled respectively to the traction elements 18. The drive system 12 is configured such that diagonally opposite traction elements 18 are coupled to a respective supply unit 21. For example, in a vehicle 10 with four traction elements 18 (e.g., a four-wheel drive loader), the left front traction element 18 and the right rear traction element 18 is coupled via respective consumption units 23 to one of the two supply units 21, and the right front traction element 18 and the left rear traction element 18 is coupled via respective consumption units 23 to the other of the two supply units 21 (see, for example, U.S. patent application Ser. No. 12/546,778 filed 25 Aug. 2009, the disclosure of which is hereby incorporated by reference herein).

In other examples, the drive system 12 has one supply unit 21 and a number of consumption units 23, one for each traction element 18. In such a case, a vehicle with four traction elements 18 has four consumption units 23, each coupled to the single supply unit 21. It should be understood that the drive system 12 may employ any suitable architecture with respect to the units 21, 23 (i.e., any suitable number of supply units 21 and any suitable number of consumption units 23).

For ease of description, since each supply unit 21 is structurally and functionally similar to one another (if there is more than one supply unit 21), and since each consumption unit 23 is structurally and functionally similar to one another (if there is more than one consumption unit 23), only one of the supply units 21 and only one of the consumption units 23, which is coupled to that supply unit 21, are discussed.

The engine 20 is configured to provide motive power for the vehicle 10. The engine 20 is configured, for example, as a diesel engine or other internal combustion engine which may operate at a generally constant speed (e.g., 1800 revolutions per minute), although the engine 20 may experience, or be allowed to experience, some minimal speed variation due to, for example, load on the engine 20 or mechanical energy put back on the engine 20 by the generator 24.

The engine 20 is coupled directly or indirectly to the generator 24 to establish a mechanical connection between the engine 20 and the generator 24. For example, the gearbox 22 is coupled between the engine 20 and the generator 24 so as to provide an increase in speed from the engine 20 to the generator 24, allowing the generator 24 to be reduced in physical size and power (i.e., continuous load capacity), with an associated cost decrease. The volumetric size decrease of the generator 24 is roughly inversely proportional to such speed increase. In an example, the gearbox 22 provides a 3:1 speed increase for the generator 24 (ratio in form of output of geargbox:input of gearbox). It is within the scope of this disclosure to eliminate the gearbox 22 such that the engine 20 is coupled to the generator 24 without an intermediate gearbox 22. The engine 20 (or the gearbox 22) may have a number of other outputs to operate one or more hydraulic pumps, etc. of the vehicle 10. The engine 20 and the gearbox 22, or the engine 20 alone if there is no gearbox 22, is referred to as a power source.

The DC bus 28 is coupled electrically between the generator 24 and the SR motor 32 via the power converter 26 and the power inverter 30. The power converter 26 is coupled electrically between the generator 24 and the DC bus 28, and the power inverter 30 is coupled electrically between the DC bus 28 and the SR motor 32.

The generator 24 is configured to convert mechanical energy into electrical energy (generating mode), or to convert electrical energy into mechanical energy like a motor (motoring mode). In the generating mode, the generator 24 is operable to convert mechanical energy from the power source into electrical energy for supply onto the bus 28. In the motoring mode, the generator 24 is operable to remove electrical energy from the bus 28 and convert it into mechanical energy for the power source, which is useful, for example, to assist the engine 20 with a load such as, for example, a hydraulic load (e.g., raise a bucket hydraulically). Exemplarily, the generator 24 may take the form of a high-speed three-phase interior-permanent-magnet brushless synchronous generator having three phase windings, or other suitable form.

The SR motor 32 is configured to convert electrical energy into mechanical energy (motoring mode), or to convert mechanical energy into electrical energy (braking mode). In the motoring mode, the SR motor 32 is operable to remove electrical energy from the DC bus 28 and convert it into mechanical energy. In the braking mode, the SR motor 32 is operable to convert mechanical energy into electrical energy for supply onto the bus 28 thereby braking (i.e., slowing down) the rotational speed of the SR motor 32 and thus the speed of the vehicle 10.

Referring to FIG. 3, the SR motor 32 has a stator 74 and a rotor 76 mounted within the stator 74 for rotation therein about a rotation axis 77. The SR motor 32 has a plurality of phases. Each phase is operable in a plurality of operational modes. The SR motor 32 may have three phases (e.g., A, B, and C), although, in other embodiments, it may have more or less phases. Each phase has a winding 42 coiled in series about one or more pairs of diametrically opposite stator poles of that phase.

As a three-phase motor, the SR motor 32 has, for example, an 18:12 pole ratio such that the stator 74 has 18 salient poles and the rotor 76 has 12 salient poles, although other pole ratios are suitable as well. In the case of an 18:12 SR motor, each of the three windings 42 is coiled in series about three pairs of diametrically opposite poles. For example, the winding 42 of phase A is wound about poles a and a' of phase A; the winding 42 of phase B is wound about poles b and b' of phase B; and the winding 42 of phase C is wound about poles c and c' of phase C. The phases can be controlled independently.

Referring back to FIG. 2, the drive system 12 has a voltage sensor 36, current sensors 38, position sensors 39, and a control system 40. The voltage sensor 36 is coupled electrically to the DC bus 28 to sense a DC bus voltage of the DC bus 28 and output a DC bus voltage signal indicative thereof. The control system 40 is coupled electrically to the voltage sensor 36.

Figure 4:
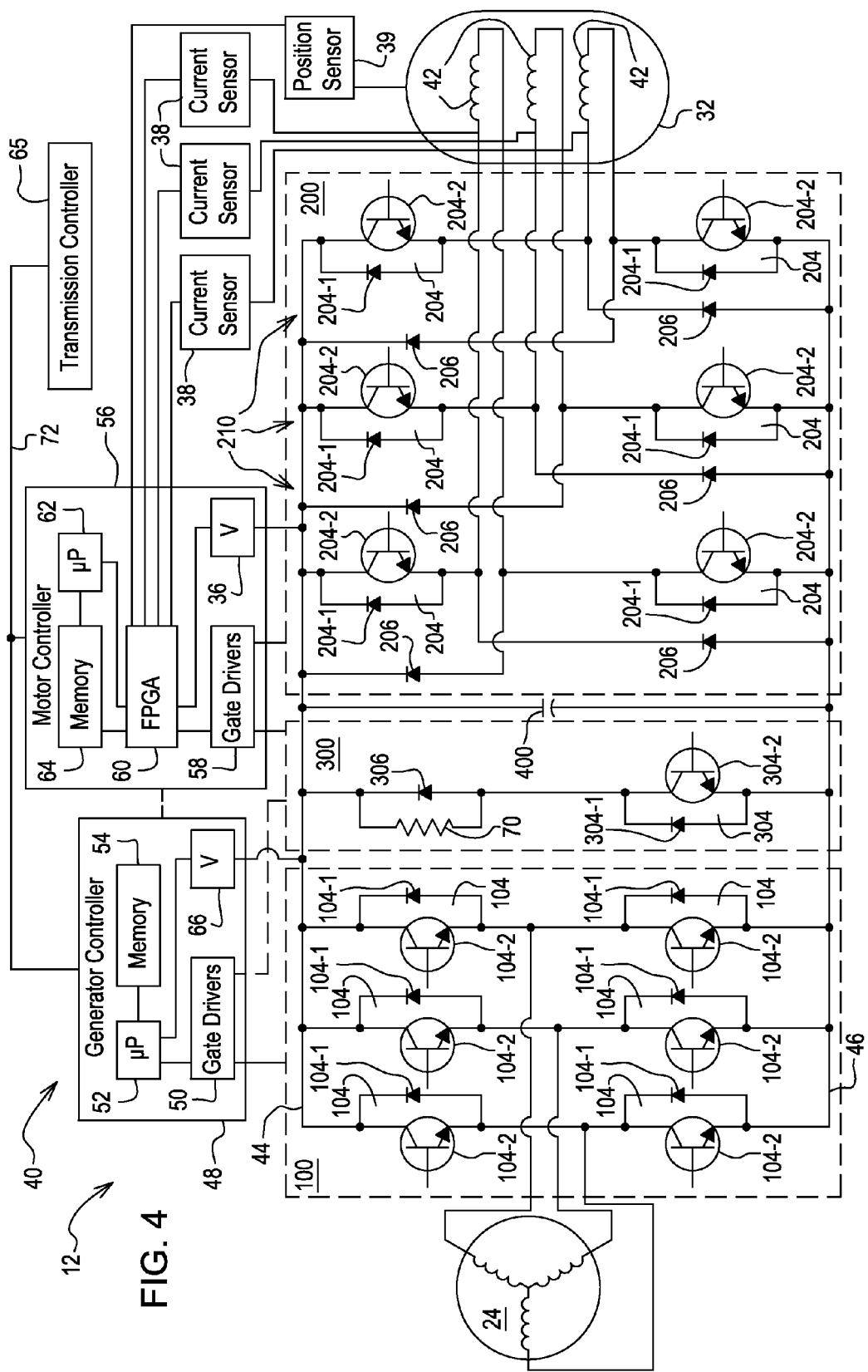
FIG. 4 is a diagrammatic view of electrical portions of the drive system.

The drive system 12 has a current sensor 38 for each phase of each SR motor 32. As such, if each SR motor 32 has a plurality of phases (e.g., three), the drive system 12 has a plurality of current sensors for each motor 32 (e.g., three) (FIG. 4). In such a case, each current sensor 38 is coupled electrically to a respective phase of the phases of the SR motor 32 to sense a phase current of that phase and output a phase current signal indicative of that phase current.

The drive system 12 has a position sensor 39 respectively for each SR motor 32 (i.e., the same number of position sensors 39 as SR motors, each position sensor 39 for a respective one of the SR motors 32). Each position sensor 39 is arranged to sense an angular position of the rotor 76 (e.g., of the rotor shaft) relative to the rotation axis 77 of the rotor 76 (or relative to the stator 74) and to output a position signal indicative of the angular position. The position sensor 39 is configured in a variety of ways, such as, for example, an opto-interrupter with slotted disk or a high-precision encoder. In other embodiments, the angular position of the rotor 76 is determined without a position sensor 39, by use of a suitable control scheme known in the art.

Referring to FIG. 4, the bus 28 has a positive DC power rail 44 and a negative DC power rail 46. The negative DC power rail is coupled electrically to ground. The nominal voltage of the bus 28 between the positive and negative DC power rails 44, 46 is, for example, 700 Volts DC (VDC).

The power converter 26 is configured, for example, as an AC-DC converter to convert three-phase AC power from the generator 24 into DC power for the bus 28, and vice versa. The converter 26 may take the form of the illustrated power converter 100 coupled electrically between the rails 44, 46, and the generator 24 is configured as a three-phase interior-permanent-magnet synchronous generator.

The power converter 100 includes six switch packages 104, each switch package 104 including a diode 104-1 and a transistor switch 104-2 (e.g., an insulated gate bipolar junction transistor or IGBT). Respective switch packages 104 is coupled to a respective one of the generator phase windings to convert AC power from that winding into DC power on the bus 28 at a nominal voltage of, for example, 700 VDC between the positive DC power rail 44 and the negative DC power rail 46. When the appropriate voltage is applied to the base of a switch 104-2 of the power converter 100, the switch is activated (closed) and the collector is coupled electrically to the emitter to supply electrical power. The power converter 100 is operated in reverse if the generator 24 is to operate as a motor (e.g., to assist the engine 20 with a hydraulic load).

The power converter 100 is under the control of a generator controller 48 included in the control system 40 for control of the generator 24. If there is more than one supply unit 21 and thus more than one power converter 100, the control system 40 may have a number of generator controllers 48, one for each power converter 100, or a single generator controller 48 for all the power converter 100. Each generator controller 48 has gate drivers 50, a microprocessor 52 coupled electrically to the gate drivers 50, and memory 54 coupled electrically to the microprocessor 50 and having stored therein operating instructions for the microprocessor 52. The base of each switch 104-2 is coupled electrically to a respective gate driver 50 that is dedicated to that switch 104-2 and provides a low DC voltage (e.g., 24 VDC) to turn on and off that switch 104-2. A switch 104-2 is closed when it is turned on, and opened when it is turned off. Thus, there is a gate driver 50 for each switch 104-2 of the power converter 100. The gate drivers 50 for the switches 104-2 of the power converter 100 is under the control of the microprocessor 52, which may employ a pulse-width-modulation control scheme, such as one that is well-known to a person of ordinary skill in the art (e.g., space-vector modulation), to control those gate drivers 50 and the switches 104-2 of the power converter 100 to supply electrical energy on the bus 28 in the generating mode of the generator 24 and remove electrical energy from the bus 28 in the motoring mode of the generator 24.

The power inverter 30 is coupled electrically between the DC bus 28 and the SR motor 32. The power inverter 30 is configured, for example, as a DC-AC inverter to convert DC power from the bus 28 into three-phase AC power for the SR motor 32, and vice versa. The inverter 30 may take the form of the illustrated power inverter 200 coupled electrically between the rails 44, 46, and the motor 32 is configured as a three-phase SR motor 202 having three phase windings 42 (e.g., each winding $700V_{RMS}$). Electrical power at a nominal voltage of, for example, 700 VDC is provided to the inverter 200 by the positive and negative DC power rails 44, 46 of the bus 28.

The power inverter 200 includes six switch packages 204, each switch package 204 including a diode 204-1 and a switch 204-2 (e.g., an IGBT), and six free-wheeling power diodes 206. When the appropriate voltage is applied to the base of a switch 204-2 of the power inverter 200, the switch is activated (closed) and the collector is coupled electrically to the emitter to supply electrical power to the respective winding 42. The power inverter 200 is operated in reverse if the SR motor 32 is to operate as a generator.

The power inverter 200 and the motor phase windings 42 is arranged in an asymmetric half-bridge configuration. Respective switch packages 204 and power diodes 206 is coupled electrically to a respective one of the motor phase windings 42 in such an asymmetric half-bridge configuration. As such, the power inverter 200 may have three sections 210, one for each phase such that each section 210 is associated with one of the phase windings 42 as shown, for example, in FIG. 5 with respect to one of the sections 210. The sections 210 enable individual control of the individual phases. Each section 210 has a high-side switch 204-2 coupled electrically to the positive DC rail 44, a low-side switch 204-2 coupled electrically to the negative DC rail 46, a free-wheeling high-side diode 206 coupled electrically to the positive DC rail 44, and a free-wheeling low-side diode 206 coupled electrically to the negative DC rail 46. The high-side switch 204-2 and the high-side diode 206 are coupled in reverse parallel, and the low-side switch-204-2 and the low-side diode 206 are coupled in reverse parallel.

The power inverter 200 is under the control of a respective motor controller 56 of the control system 40. Stated otherwise, the control system 40 may have a motor controller 56 for each power inverter 200 to control that inverter 200. Only one such motor controller 56 is discussed and shown herein, since the others are similar to it, and references to components of that motor controller 56 within this detailed description are to be understood as references to that motor controller 56 and the control system 40. The motor controller 56 has gate drivers 58, a field programmable gate array 60 (FPGA) coupled electrically to the gate drivers 58, a microprocessor 62 coupled electrically to the FPGA 60, and memory 64 coupled electrically to both the FPGA 60 and the microprocessor 62 and having stored therein operating instructions for the FPGA 60 and the microprocessor 52. The microprocessor 62 is, for example, a digital signal processor, but, for sake of discussion, it is referred to herein as the microprocessor 62. The base of each switch 204-2 is coupled electrically to a respective gate driver 58 that is dedicated to that switch 204-2 and provides a low DC voltage (e.g., 24 VDC) to turn on and off that switch 204-2. A switch 204-2 is closed when it is turned on, and opened when it is turned off. The gate drivers 58 are under the control of the FPGA 60 which may employ an SR motor control scheme well-known to a person of ordinary skill in the art, or any other suitable SR motor control scheme, to control the gate drivers 58, the switches 204-2, and thus the SR motor 32 (including varying the amplitudes and frequencies to the motor windings 42) so as to vary the torque output of the motor 32 when the motor 32 is in its motoring mode or to vary the electrical generation capacity of the motor 16 when the motor 16 is in its braking mode.

The motor controller 56 may receive a torque request from a transmission controller 65 via a communications bus 72 (e.g., CAN bus). The torque request is for motoring in the motoring mode or electrical braking in the braking mode. The motor controller 56 may establish the torque request as a motor torque setpoint or make the motor torque setpoint different from the torque request if it determines there is a need to do so (e.g., to avoid motor overheating). The motor controller 56 may thereafter command operation of the motor 16 at the motor torque setpoint.

A brake resistor 70 is configured to dissipate excess electrical energy on the bus 28 as heat. The dissipated energy is transferred as heat from the brake resistor 70 to liquid coolant or other suitable cooling media. The brake resistor 70 may take the form of a bank of resistors having a number of discrete resistor elements that is arranged (e.g., in series and in parallel) to provide a desired resistance and is water-cooled (e.g., using liquid engine coolant).

The drive system 12 may include a brake chopper to control use of the brake resistor 70 to dissipate electrical power from the bus 28. The brake chopper may take the form of the illustrated brake chopper 300. In such a case, the brake chopper 300 includes a switch package 304, with its diode 304-1 and a switch 304-2 (e.g., IGBT), and a diode 306. The diode 306 is in parallel with the brake resistor 70. When the appropriate voltage is applied to the base of the switch 304-2 of the brake chopper 300, the switch is activated (closed) and the collector is coupled electrically to the emitter to allow dissipation of electrical power through the brake resistor 70. The gate driver for the switch 304-2 of the brake chopper 300 issues the brake resistor control signal in the form of, for example, a pulse-width modulated voltage signal that applies the voltage to the base of the switch 304-2, the voltage signal being pulse-width modulated according to a brake duty to turn the brake resistor 70 on (closed), so as to dissipate electrical energy from the bus 28, and off (opened) correspondingly.

The gate driver for the switch 304-2 of the brake chopper 300 is one of the gate drivers 58 of the motor controller 56. Such gate driver 58 for the switch 304-2 is under the control of the FPGA 60 of the motor controller 56 to control that gate driver 58, the switch 304-2, and the brake resistor 70. It is contemplated that, in other embodiments, the gate driver for the switch 304-2 is one of the gate drivers 50 of the generator controller 48. In such a case, that gate driver 50 is under the control of the microprocessor 52 of the generator controller 48 to control that gate driver 50, the switch 304-2, and the brake resistor 70.

A DC link capacitor 400 (e.g., 700 VDC) is provided between the power rails 44, 46. The capacitor 400 is configured, for example, as a bank of capacitors.

The drive system 12 may have one or more voltage sensors each coupled electrically across the rails 44, 46 to sense the DC bus voltage. Such voltage sensors are stand-alone voltage sensors or are "included" in any of the controllers 48, 56 illustratively in the sense that the voltage sensor is mounted on the control board of that controller 48, 56. In such a case, the generator controller 48 may include a voltage sensor 66 coupled electrically to the microprocessor 52 and to the bus 28, and each motor controller 56 may include a voltage sensor 36 coupled electrically to the FPGA 60. Alternatively, any of the voltage sensors 66, 36 may be a stand-alone voltage sensor, or may serve more than one controller 48, 56. The voltage sensors 66, 36 are considered separate from the control system 40 since they provide inputs for the control system 40.

As alluded to herein, each SR motor 32 has a plurality of phases (e.g., three), each phase having a winding 42. Each phase is operable in a plurality of operational modes. Current sensors 38 are coupled electrically respectively to the phases of the SR motor 32. The motor controller 56 for the SR motor 32 is coupled electrically to each of the current sensors 38. For example, the FPGA 60 of the motor controller 56 is coupled electrically directly to each of the current sensors 38 to receive the phase current signals directly therefrom as an analog input, to the voltage sensor 36 to receive the DC bus voltage signal directly therefrom as analog input, and to the position sensor 39 for the SR motor 32 to receive the position signal directly therefrom as an analog input.

The motor controller 56 is configured to control the SR motor 32 so as to synchronize activation of the motor phases with rotor position. As alluded to herein, rotor angular position is obtained in a variety of ways, such as, for example, directly by use of a position sensor 39 or indirectly without use of such a position sensor.

Based on the angular position of the rotor 76, the motor controller 56 (e.g., the FPGA 60 thereof) controls the inverter 200 via the respective gate drivers 58 to cycle the SR motor 32 sequentially through its phases in electrical cycles, with the SR motor 32 being sequenced through phase A, phase B, and phase C during each cycle where the SR motor 32 is a three-phase SR motor. An electrical cycle begins at a first angular position of the rotor 76 sensed by the position sensor 39 and end at a second angular position of the rotor 76 sensed by the position sensor 39. The next electrical cycle begins at the second angular rotor position and ends at a third angular position sensed by the position sensor 39, with subsequent electrical cycles occurring in a similar manner. The SR motor 32 has the same number of electrical cycles per revolution of the rotor 76 as the number of poles of its rotor 76. In the case of an 18:12 SR motor, the SR motor 32 has 12 electrical cycles per revolution of the rotor 76.

Figure 5:
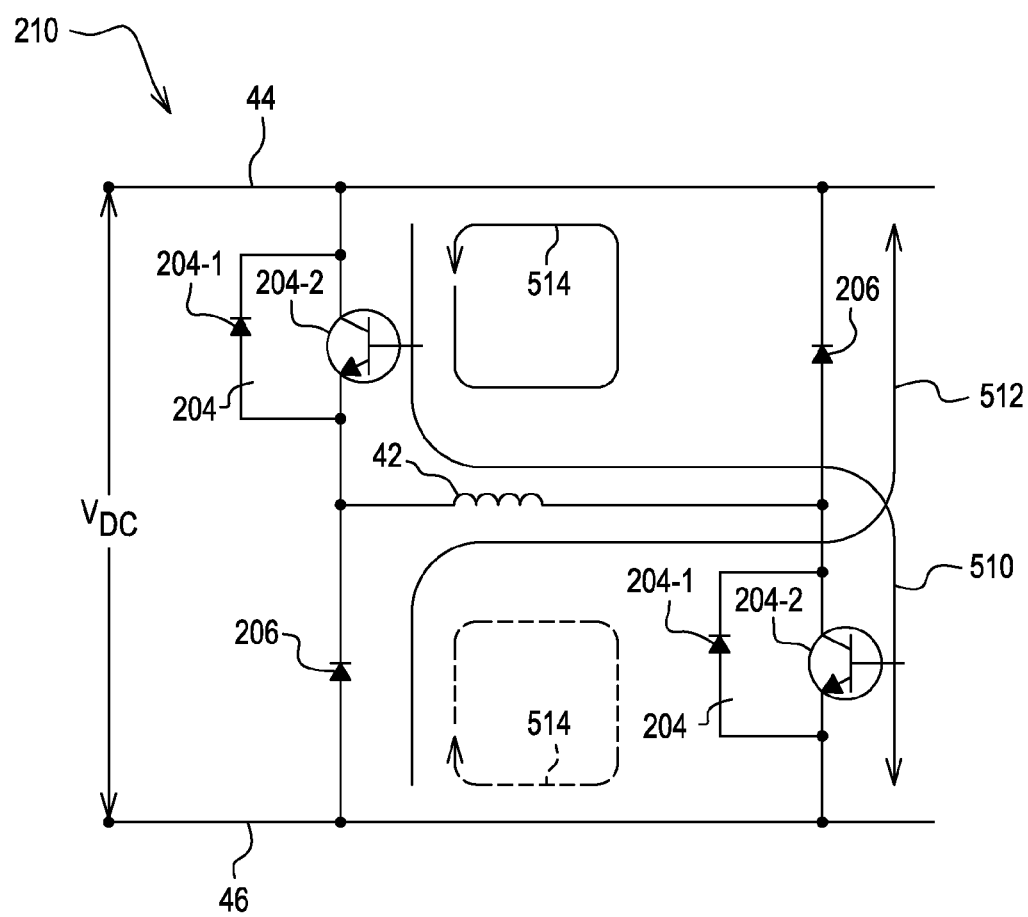
FIG. 5 is an enlarged diagrammatic view showing a section of a power inverter for a phase of the SR motor.

Referring to FIG. 5, the SR motor 32 is driven by voltage strokes in correspondence with rotor position. Each phase of the SR motor 32 is selectively operable in operational modes. For example, each phase of the SR motor 32 is operable in three operational modes: a first or charging operational mode, a second or discharging operational mode, and a third or free-wheeling operational mode.

The power inverter 210 may have a section 210 associated respectively with each phase of the SR motor 32. In such a case, in the first operational mode, the high-side switch 204-2 and the low-side switch 204-2 are closed, such that the phase current flows in the direction 510 through the high-side and low-side switches 204-2 and the respective phase winding 42 is coupled electrically to the DC bus voltage ramping up the magnetic flux. In the second operational mode, both of the high-side and low-side switches 204-2 are opened and both of the diodes 206 are conducting such that the phase current flows in the direction 512 through the diodes 206 ramping down the magnetic flux so as to return the trapped magnetic energy to the DC bus 28.

In the third operational mode, only one of the high-side switch 204-2 and the low-side switch 204-2 is closed. For example, in the third operational mode, the high-side switch 204-2 and the high-side diode 206 are respectively closed and conducting, and the low-side switch 204-2 and the low-side diode are respectively opened and non-conducting (i.e., only one of the switches 204-2 is closed), such that current flows in the (solid line) direction 514 and the magnetic flux stays constant. Alternatively, in the third operational mode, the low-side switch 204-2 and the low-side diode are respectively closed and conducting, and the high-side switch 204-2 and the high-side diode 206 are respectively opened and non-conducting (i.e., only one of the switches 204-2 is closed), such that current flows in the (phantom line) direction 514 and the magnetic flux stays constant.

The motor controller 56 (e.g., the FPGA 60 thereof) controls the inverter 200 via the respective gate drivers 58 to operate the phases selectively in the operational modes according to any suitable motor control scheme. The motor control scheme involves any or all of the three operational modes. The particular control scheme used for controlling which operational modes to activate and de-activate and when to activate and de-activate them is not germane to the present disclosure, since, as is discussed herein with respect to an embodiment, a torque estimation control routine 600 of the system 40 simply monitors the opened-or-closed status of the switches 204-2 to determine which phase voltage equation to apply as part of estimating motor torque.

With respect to each SR motor 32, the control system 40 (e.g., the FPGA 60 of the motor controller 56 thereof) is coupled electrically to the voltage sensors 66, 36, the current sensors 38, and the position sensor 39 and is configured to control the power inverter 30 so as to activate the phases sequentially in electrical cycles and so as to operate each phase selectively in the operational modes. The control system 40 (e.g., FPGA 60 of the motor controller 56 thereof) is configured to: receive the DC bus voltage signal from the voltage sensor 36 and the phase current signals from the current sensors 38, determine for each of the phases which one of the operational modes is active, with respect to each of the phases determine a phase voltage of that phase according to a function that is dependent on which one of the operational modes is active for that phase so as to differ between the operational modes and that is dependent on the DC bus voltage (sensed by the voltage sensor 36) and the phase current for that phase, and determine an estimated total torque of the SR motor 32 with respect to an electrical cycle of the electrical cycles as a function of an estimated total energy outputted to the rotor 76 of the SR motor 32 by the phases during the electrical cycle by calculating a phase power for each phase as a product of the phase current for that phase and the phase voltage for that phase, integrating the phase powers with respect to time for the electrical cycle, and dividing by an electrical angle of the electrical cycle.

Figure 6:
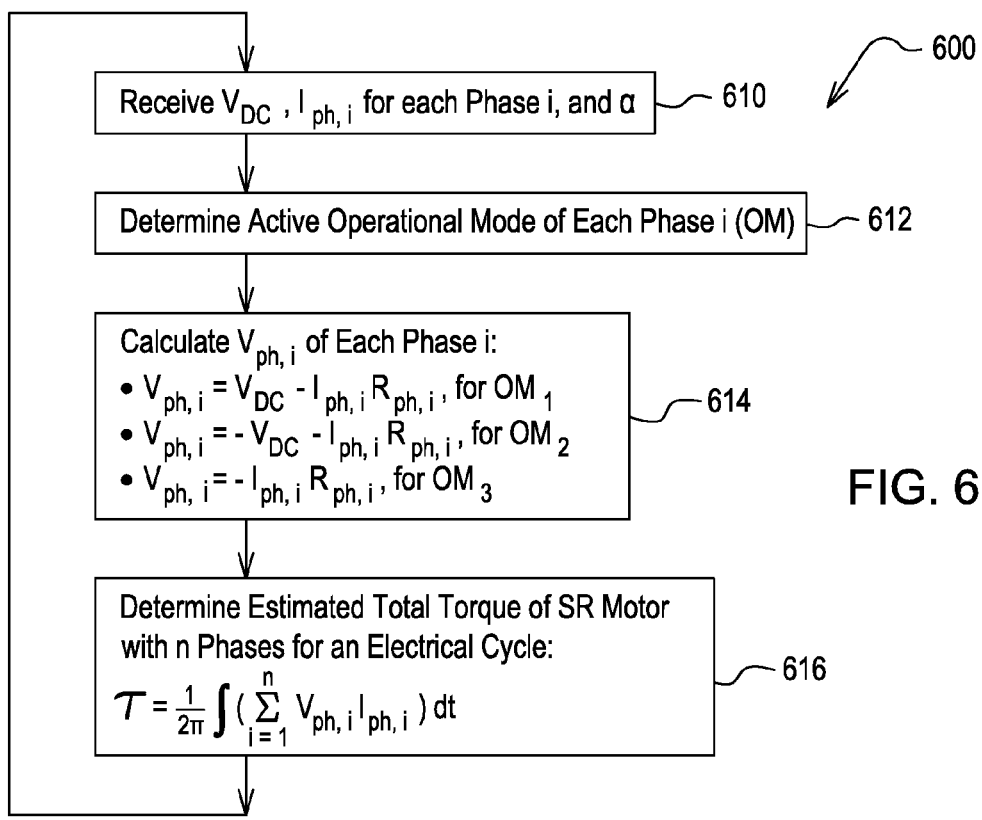
FIG. 6 is a flow chart of a control routine of a control system of the drive system.

Referring to FIG. 6, there is shown a torque estimation control routine 600 for determining an estimated total torque of the SR motor 32 with respect to an electrical cycle. In step 610, the control system 40 is configured to receive, and so receives, the DC bus voltage signal indicative of the DC bus voltage ($V_{DC}$), the phase current signal of each phase indicative of the phase current ($I_{ph}$) of that phase, and the angular position of the rotor 76 ($\alpha$). For example, the FPGA 60 of the motor controller 56 receives the DC bus voltage signal directly from the respective voltage sensor 36, each phase current signal directly from the respective current sensor 38, and the rotor angular position signal directly from the position sensor 39 for the motor 32 at a sampling rate (e.g., 10 microseconds). The FPGA 60 does so for each phase at each sampling point.

In step 612, the control system 40 (e.g., the FPGA 60 of the motor controller 56) is configured to determine, and so determines, the active operational mode with respect to each phase. With respect to each phase, the control system 40 (e.g., the FPGA 60 of the control system 40) is configured to determine, and so determine, for that phase which one of the operational modes is active based on the opened-or-closed status of the two switches 204-2 associated with that phase. To do so, the control system 40 (e.g., FPGA 60 of the motor controller 56 thereof) determines what is the commanded state of each switch 204-2. If the commanded state of the high-switch 204-2 is closed and the commanded state of the low-switch 204-2 is closed, the control system 40 (e.g., FPGA 60 of the motor controller 56 thereof) determines that the first operational mode is active. If the commanded state of the high-switch 204-2 is opened and the commanded state of the low-switch 204-2 is opened, the control system 40 (e.g., FPGA 60 of the control system 40) determines that the second operational mode is active. If one of the high-switch 204-2 and the low-switch 204-2 is closed and the other of the high-switch 204-2 and the low-switch 204-2 is opened, the control system 40 (e.g., FPGA 60 of the control system 40) determines that the third operational mode is active.

In step 614, with respect to each phase, the control system 40 (e.g., the FPGA 60 of the motor controller 56 thereof) is configured to calculate, and so calculates, the phase voltage of that phase according to the following function (phase voltage function):

$V_{ph}=V_{dc}-I_{ph}R_{ph}$ when that phase is in the first operational mode, $V_{ph}=-V_{dc}-I_{ph}R_{ph}$ when that phase is in the second operational mode, and $V_{ph}=-I_{ph}R_{ph}$ when that phase is in the third operational mode, where $V_{dc}$ is the DC bus voltage, $V_{ph}$ is the phase voltage of that phase, $I_{ph}$ is the phase current of that phase, and $R_{ph}$ is a phase resistance of that phase. The DC bus voltage is the voltage value received from the voltage sensor 36. The phase current is the current value received from the current sensor 38 for that phase. The phase resistance is the resistance of the respective winding 42 (exemplarily taken as a constant).

In step 616, the control system 40 (e.g., FPGA 60 of the control system 40) is configured to calculate, and so calculates, the estimated total torque with respect to an electrical cycle according to the following function:

$$\tau = \frac{1}{2\pi}\int\left(\sum_{i=1}^{n} V_{ph,i}I_{ph,i}\right)dt$$

where $\tau$ is the estimated total torque, n is the number of phases (e.g., three), i represents a phase among the n phases, $V_{ph,i}$ is the phase voltage of the phase i, $I_{ph,i}$ is the phase current of the phase i, and the integral term is the estimated total energy (E), in particular $$E = \int\left(\sum_{i=1}^{n} V_{ph,i}I_{ph,i}\right)dt$$

Stated otherwise, at each sampling point of an electrical cycle, the control system 40 (e.g., the FPGA 60 of the control system 40) receives the phase current of each phase, calculates the phase voltage of that phase, and multiplies those two values to obtain a phase power for that phase. The control system 40 (e.g., the FPGA 60 of the motor controller 56 thereof) sums the phase powers, and multiplies that sum by the time step (e.g., 10 microseconds) (i.e., the sampling rate) to obtain an estimated energy outputted to the rotor 76 by the phases during the time step just taken. The control system 40 (e.g., the FPGA 60 of the motor controller 56 thereof) calculates such an energy value at each sampling point in an electrical cycle, and sums those energy values to obtain the estimated total energy outputted to the rotor 76 by the phases during the electrical cycle. It should be understood that any suitable numerical integration method is used to calculate that estimated total energy.

The control system 40 (e.g., the FPGA 60 of the motor controller 56 thereof) calculates the estimated total torque for the electrical cycle by dividing the estimated total energy by $2\pi$ (the electrical angle of the electrical cycle), in particular $$\tau = \frac{E}{2\pi}$$

The control system 40 (e.g., the FPGA 60 of the motor controller 56 thereof) thus determines such an estimated total torque for each electrical cycle. It should be understood that since the time step and $2\pi$ are constants, they can be applied to the torque estimation calculation at any suitable time. For example, the time step may be multiplied to each phase power, to each phase power sum, or after summing the sums of the phase powers. The constant $2\pi$ may be similarly applied but effectively as a divisor.

The SR motor 32 has a plurality of electrical cycles per revolution of the rotor 76, and the control system 40 (e.g., the FPGA 60) calculates an estimated total torque for each electrical cycle. In the case where the SR motor 32 is an 18/12 SR motor, since there are 12 electrical cycles per revolution of the rotor 76, the control system 40 (e.g., the FPGA 60 of the motor controller 56 thereof) determines 12 estimated total torques per revolution of such an SR motor.

As alluded to herein, the beginning of each electrical cycle corresponds to a particular rotor angular position and the end of that electrical cycle corresponds to a particular rotor angular position. For purposes of the torque estimation control scheme 600, the control system 40 (e.g., the FPGA 60 of the motor controller 56 thereof) knows when each electrical cycle starts and stops based on rotor angular position (e.g., by virtue of a table stored in memory 64 and relating electrical angle and rotor angular position).

The control system 40 may thus account for dynamic variants in the drive system 10, such as, for example the DC bus voltage and phase currents. The DC bus voltage may drop or increase relative to its nominal voltage depending on whether the SR motor 32 is motoring or braking. The control system 40 receives readings of the actual DC bus voltage in order to take into account variations in the DC bus voltage. The control system 40 receives readings of each phase current to take into account variations in each phase current. As such, the control system 10 may account for dynamic variants in the drive system 10.

The control system 40 may use the estimated total torque in a variety of ways. For example, it may use the calculated estimated total torque for closed-loop torque control of the SR motor 32 (e.g., with respect to a motor torque setpoint) or closed-loop speed control of the SR motor 32, for enhanced traction control of the vehicle 10 and reduced tire wear.

It is within the scope of this disclosure for a microprocessor (e.g., microprocessor 62 in the form of, for example, a digital signal processor) to be used in place of the FPGA 60 as long as the sampling rate of the analog inputs is sufficiently fast for control of the SR motor 32.

In other embodiments, the drive system 12 may have a single SR motor 32 coupled operatively to the traction elements 18 via, for example, a transmission and associated drive mechanisms.

While the disclosure has been illustrated and described in detail in the drawings and foregoing description, such illustration and description is to be considered as exemplary and not restrictive in character, it being understood that exemplary embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A drive system, comprising:
a DC bus,
a switched reluctance motor (SR motor),
a power inverter coupled electrically between the DC bus and the SR motor, the SR motor comprising phases each of which is operable in operational modes,
a voltage sensor coupled electrically to the DC bus to sense a DC bus voltage of the DC bus and output a DC bus voltage signal indicative thereof,
current sensors, each current sensor coupled electrically to a respective phase of the phases of the SR motor to sense a phase current of that phase and output a phase current signal indicative of that phase current, and
a control system coupled electrically to the voltage sensor and the current sensors, the control system configured to control the power inverter so as to activate the phases sequentially in electrical cycles and so as to operate each phase selectively in the operational modes, the control system configured to:
receive the DC bus voltage signal and the phase current signals,
determine for each of the phases which one of the operational modes is active,
with respect to each of the phases, determine a phase voltage of that phase according to a function that is dependent on which one of the operational modes is active for that phase so as to differ between the operational modes and that is dependent on the DC bus voltage and the phase current for that phase, and
determine an estimated total torque of the SR motor with respect to an electrical cycle of the electrical cycles as a function of an estimated total energy outputted to a rotor of the SR motor by the phases during the electrical cycle by calculating a phase power for each phase as a product of the phase current for that phase and the phase voltage for that phase, integrating the phase powers with respect to time for the electrical cycle, and dividing by an electrical angle of the electrical cycle.

2. The drive system of claim 1, wherein, with respect to each phase: the power inverter comprises two switches associated with that phase, and the control system is configured to determine for that phase which one of the operational modes is active based on an opened-or-closed status of the two switches associated with that phase.

3. The drive system of claim 1, wherein, with respect to each phase: the power inverter comprises two switches and two diodes, the two switches and the two diodes are coupled electrically to a winding of the respective phase in an asymmetric half-bridge configuration, the operational modes comprise a first operational mode in which the first and second switches are closed, a second operational mode in which the first and second switches are opened, and a third operational mode in which only one of the two switches is closed, and the control system is configured to determine for that phase which one of the operational modes is active based on an opened-or-closed status of the two switches associated with that phase.

4. The drive system of claim 1, wherein:
the operational modes comprise a first operational mode, a second operational mode, and a third operational mode, and
with respect to each phase, the control system is configured to calculate the phase voltage of that phase according to the following function:
$V_{ph}=V_{dc}-I_{ph}R_{ph}$ when that phase is in the first operational mode,
$V_{ph}=-V_{dc}-I_{ph}R_{ph}$ when that phase is in the second operational mode, and
$V_{ph}=-I_{ph}R_{ph}$ when that phase is in the third operational mode,
where $V_{dc}$ is the DC bus voltage, $V_{ph}$ is the phase voltage of that phase, $I_{ph}$ is the phase current of that phase, and $R_{ph}$ is a phase resistance of that phase.

5. The drive system of claim 4, wherein the control system is configured to calculate the estimated total torque with respect to the electrical cycle according to the following function:

$$\tau = \frac{1}{2\pi} \int \left( \sum_{i=1}^{n} V_{ph,i} I_{ph,i} \right) dt,$$

where $\tau$ is the estimated total torque, n is the number of phases, i represents a phase among the n phases, $V_{ph,i}$ is the phase voltage of the phase i, $I_{ph,i}$ is the phase current of the phase i, and the integral term is the estimated total energy.

6. The drive system of claim 1, wherein the control system is configured to calculate the estimated total torque with respect to the electrical cycle according to the following function:

$$\tau = \frac{1}{2\pi} \int \left( \sum_{i=1}^{n} V_{ph,i} I_{ph,i} \right) dt,$$

where $\tau$ is the estimated total torque, n is the number of phases, i represents a phase among the n phases, $V_{ph,i}$ is the phase voltage of the phase i, $I_{ph,i}$ is the phase current of the phase i, and the integral term is the estimated total energy.

7. The drive system of claim 6, wherein n=3.

8. The drive system of claim 1, further comprising a position sensor arranged to sense an angular position of the rotor relative to a rotation axis of the rotor and output a position signal indicative of the angular position, and the control system is coupled electrically to the position sensor and is configured to receive the position signal.

9. The drive system of claim 1, wherein the control system comprises a field programmable gate array (FPGA).

10. The drive system of claim 9, wherein the FPGA is configured to calculate the phase voltage of each phase.

11. The drive system of claim 9, wherein the FPGA is configured to calculate the estimated total torque with respect to the electrical cycle.

12. The drive system of claim 1 in combination with a traction element to which the SR motor is coupled.

13. The drive system of claim 5, wherein n=3.

* * * * *